United States Patent [19]

Schultz

[11] Patent Number: 4,949,890
[45] Date of Patent: Aug. 21, 1990

[54] FILING, ORGANIZING AND DESK DEVICE FOR USE IN MOTOR VEHICLES

[76] Inventor: Victor K. Schultz, 21310 Willow Wisp, St. Clair Shores, Mich. 48082

[21] Appl. No.: 373,141
[22] Filed: Jun. 28, 1989
[51] Int. Cl.⁵ .............................................. B60R 7/00
[52] U.S. Cl. .................................. 224/275; 224/42.42
[58] Field of Search ..................... 224/275, 42.42, 277; 297/188; 108/44; 312/235.8, 50

[56] References Cited

U.S. PATENT DOCUMENTS

| | | | |
|---|---|---|---|
| 480,388 | 8/1892 | Miller | 312/50 |
| 2,633,180 | 3/1953 | Reed | 224/275 |
| 3,279,872 | 10/1966 | Howke | 224/275 |
| 3,338,629 | 8/1967 | Drees | 312/235.8 |
| 3,873,010 | 3/1975 | Patterson . | |
| 3,922,973 | 12/1975 | Sturgeon | 108/44 |
| 4,146,159 | 3/1979 | Hemmen . | |
| 4,512,503 | 4/1985 | Gioso . | |
| 4,762,331 | 8/1988 | Tucker et al. . | |
| 4,796,791 | 1/1989 | Goss et al. . | |

FOREIGN PATENT DOCUMENTS 59401 10/1891 Fed. Rep. of Germany ........ 312/50

*Primary Examiner*—Linda J. Sholl
*Attorney, Agent, or Firm*—Peter D. Keefe

[57] ABSTRACT

A filing, organizing and desk device for placement upon the passenger seat of a motor vehicle. A multiply shelved filer unit is provided having two sidewalls and a rearwall. A flat desk surface top is connected to the filer unit, the top including receptacles for loose articles and a drink cup, and further including a perimeter lip for preventing objects from sliding off the top during driving. A leveling system is interconnected with the two sidewalls of the filer unit so that the desk surface may be levelled irrespective of seat contour. An upturned hook is connected to one of the sidewalls of the filer unit, thereby providing a restraint system that easily connects with the lap portion of a conventional seat belt.

22 Claims, 1 Drawing Sheet

U.S. Patent  Aug. 21, 1990  4,949,890
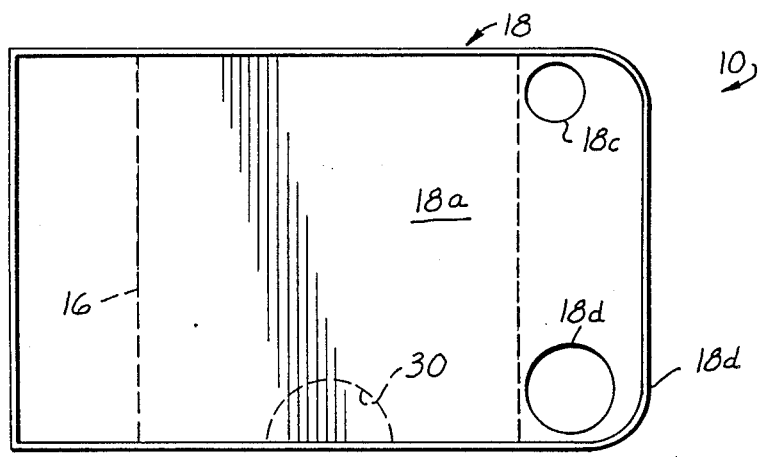
FIG. 1
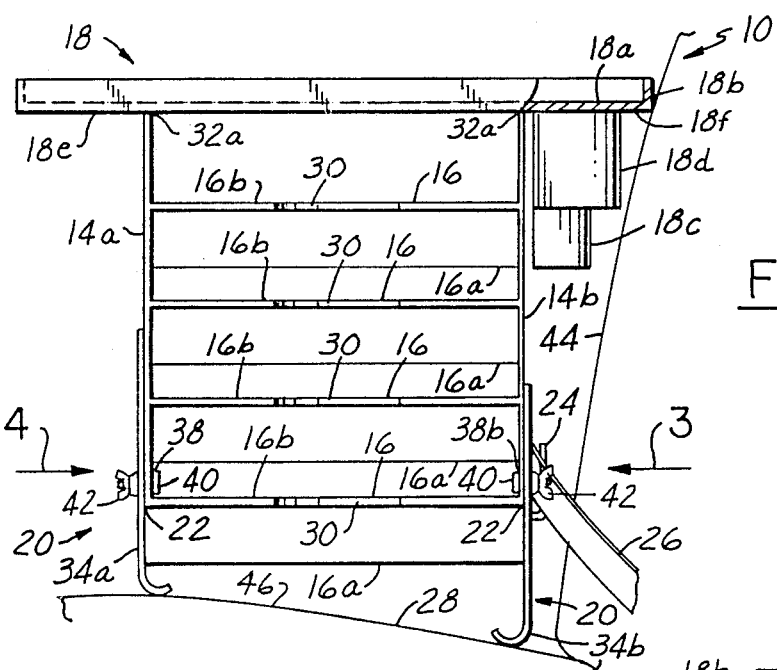
FIG. 2
FIG. 3
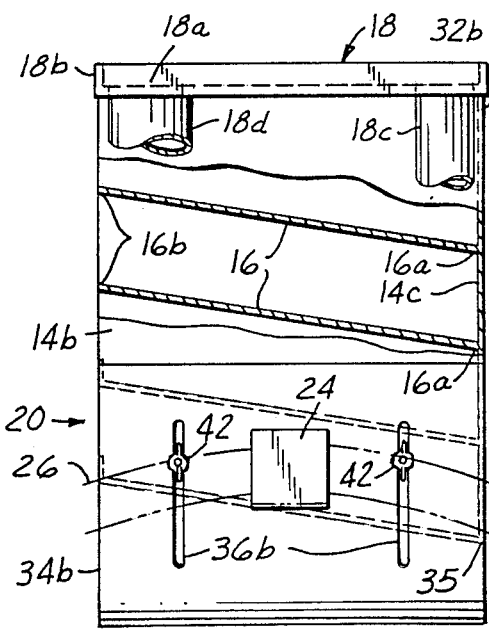
FIG. 4
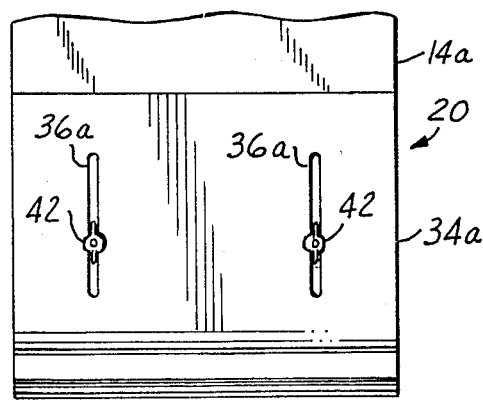

FILING, ORGANIZING AND DESK DEVICE FOR USE IN MOTOR VEHICLES

BACKGROUND OF THE INVENTION

1. Field of the Invention:

The present invention relates to filing devices and more particularly to filing devices which are adapted for use in a motor vehicle. Still more particularly the present invention relates to a filing and organizing device for motor vehicles which is adjustably and securely located on the passenger seat and which provides an effective and convenient desk surface for writing.

2. Description of the Prior Art:

With the ever increasing use of motor vehicles in the transaction of business, business people frequently find themselves in situations where business is conducted from their vehicle. This situation is being rapidly magnified by a plethora of new electronic business products that are intended for vehicular use. Most notable among these is the cellular telephone. Indeed, it has become common practice among business people at all levels to avail themselves of business related activities during commuting.

With this proliferation of vehicle related business activity, it has become increasingly necessary to have readily available those documents and other items which must be consulted in the course of vehicular transacted business. Clearly, relying upon one's briefcase is not the solution because the demands of driving are incompatible with opening and searching through a briefcase for a document. Simply relying upon documents sitting upon the passenger seat is also not a solution, as the inertial forces encountered during driving will soon turn weven the most carefully organized collection into a mass mess encompassing every corner of the passenger space of the vehicle. Therefore, what is needed is a document filing device which also provides for storage of articles, the device being adapted specifically for vehicular use.

There have been several attempts in the prior art to provide a vehicular filing device, as follows.

U.S. Pat. No. 3,873,010 to Patterson, dated Mar. 25, 1975, discloses a vehicular storage container which sits upon a passenger seat and which is held to the vehicle floor by a special trap system. A number of drawers are provided.

U.S. Pat. No. 4,146,159 to Hemmen, dated Mar. 27, 1979, discloses an automotive arm rest that sits on the passenger seat and is secured by a special strap. The arm rest has storage capacity and a place for cups.

U.S. Pat. No. 4,512,503 to Gioso, dated Apr. 23, 1985, discloses a rather complex vehicle travel organizer having a sliding top, cup holders, and various vertically oriented filing areas for articles. The travel organizer rests upon a passenger seat and is held be hook and loop fasteners or a cord which loops around the seat.

The above prior art devices suffer from inability to adjust for varying seat contours and, further, suffer from overly complicated or inadequate mechanisms to hold the device on the seat. In any event, none of the prior art devices adequately and satisfactorily provides a filing and organizing system which is in tune with today's vehicular business activity.

SUMMARY OF THE INVENTION

The present invention is a vehicular filing and organizing device which has the following features:

(1) files papers neatly and easily, and holds a variety of useful articles;

(2) provides a ready writing surface that may be used while driving;

(3) is adjustable for varying seat contours; and (4) is held in position on the seat by use of the seat belt.

To achieve these features, the present invention is structured as follows. A multiply shelved filer unit is provided, the filer unit having two sidewalls and a rearwall. A flat desk surface top is connected to the filer unit, the top including receptacles for articles and a drink cup, and further including a perimeter lip for preventing objects from falling off the top. A leveling system is interconnected with the two sidewalls of the filer unit, thereby providing a restraint system that easily connects with a conventional lap portion of a seat belt.

The vehicular filing and organizing device according to the present invention is placed upon an unoccupied passenger seat with the open shelves facing the driver, that is, the rearwall facing away from the driver. The leveling system is adjusted to level the device so that the top and shelves are level. The seat belt is then looped through the upturned hook and tightened in the usual manner to secure the device to the seat. Now, the driver can retain needed documents readily on the shelves, keep pens and other articles, as well as a drink cup in the receptacles, write as necessary on the desk surface of the top, and not worry that articles or papers resting on the top will be dislodged in the course of driving because of the lip around the perimeter of the top.

Accordingly, it is an object of the present invention to provide a filing device for documents that is suitable for vehicular use.

It is a further object of the present invention to provide a filing device for vehicular use that allows for filing of documents and that includes a writing surface having a lipped perimeter that retains articles thereon during normal driving maneuvers.

It is an additional object of the present invention to provide a filing and organizing device for vehicular use that includes receptacles for articles and beverages.

It is yet a further object of the present invention to provide a filing and organizing device for vehicular use which includes a mechanims for leveling the device with respect to the passenger seat on which it rests.

It is still another object of the present invention to provide a filing and organizing system for vehicular use which rests securely upon a passenger seat through releasable coupling with a conventional seat belt.

These, and additional objects, advantages, features and benefits of the present invention will become apparent from the following specification.

BRIEF DESCRIPTION OF THE DRAWINGS

FIG. 1 is a plan view of the vehicular filing and organizing device according to the present invention.

FIG. 2 is a part sectional front view fo the device shown in FIG. 1, showing the device in operation on the passenger seat, from the viewpoint of the driver of the vehicle.

FIG. 3 is a part sectional side view of the device shown in FIG. 1, seen along line 3 in FIG. 2, showing particularly the placement of the shelves, the restraint system and the leveling system according to the present invention.

FIG. 4 is a detail side view of the device shown in FIG. 1, seen along line 4 in FIG. 2, showing the leveling system according to the present invention.

DETAILED DESCRIPTION OF THE PREFERRED EMBODIMENT

Referring now to the Drawing, FIGS. 1 and 2 show generally the filing and organizing device 10 according to the present invention. As can be seen from these figures, the filing and organizing device 10 includes: a filer unit 12, the filer unit having two side walls 14a and 14b, rearwall 14c, and a plurality of shelves 16; a top 18 which serves as a desk surface 18a, the perimeter of the top having a lip 18b, and the top further having receptacles 18c and 18d; a leveling system 20 located at a lower portion 22 of each of the two sidewalls 14a and 14b; a restraint system in the form of an upturned hook 24 for interfacing with the seat belt 26 of the vehicle, the upturned hook being connected to one of the sidewalls. It will be further seen from the figures that the filing and organizing device 10 is structured to rest on the passenger seat 28 of the vehicle in which it is used.

With attention now focusing upon the filer unit 12, each of the shelves 16 are dimensioned to accommodate standard sized paper, preferably including legal as well as letter size, as particular needs may dictate. Each shelf 16 is connected at either end to the sidewalls 14a and 14b, and further is connected at the rear end thereof 16b to the rearwall 14c. It is preferred to angle the shelves downwardly toward the rearwall 14c, as best shown in FIG. 3. The reason for this is to enhance accessibility of the paper sheets from the shelves at their open end 16b, and to lessen the chance for an untoward discharge of the shelf contents during a driving maneuver. It is further preferred to include a notch 30 at the center of each shelf to facilitate handling of the paper sheets while they are on the shelf. The number of shelves is dictated by the vertical height of the filer and organizer unit 10, as well as the need for sorting of different kinds of papers. Typically, three to six shelves would be present, four being shown in the Drawing. The shelves 16 may be made adjustable or may be permanently mounted. A preferred construction material for the filing an organizing device 10 is plastic, with a decorative finish that is keyed to a particular vehicular interior.

With attention now turning to the top 18, the top is structured to connect with the upper end 32a of the two sidewalls 14a and 14b, as well as the upper end 32b of the rearwall 14c. The top is preferred to have an overhang 18e and 18f respectively at each sidewall 14a and 14b. Overhang 18f includes two receptacles, one receptacle 18c dimensioned for receiving loose articles such as pencils and pens, and a second receptacle 18d dimensioned for receiving a beverage container. The top 18 includes a desk surface 18a on which the driver may write, as needed during his vehicular business activity. In order that papers and articles resting on the desk surface 18a are not dislodged therefrom during normal driving, the perimeter of the top 18 has a lip 18b which rises above the desk surface 18 a. A preferred height for the lip 18b is approximately one inch, a height consonant with providing a barrier to objects sliding off the desk surface during normal driving.

With reference now to FIGS. 2 through 4, the leveling system 20, will be described. Each of the two sidewalls 14a and 14b terminates in a foot 34a and 34b, respectively. Each foot is slidably attached to its resepctive sidewall and forms a part thereof. Each foot rests upon the passenger seat, thereby supporting the filer unit and its associated top. In this regard, as shown in FIG. 3, the rearwall has a lowermost end 35 which is located so as not to interfere with the leveling system 20. The preferred structure for implementing the slidable attachment feature is as follows. A pair of elongated slots 36a and 36b are provided in each foot 34a and 34b, respectively. Adjacent the lower portion 22 of the two sidewalls 14a and 14b are located a pair of holes 38 a and 38b, respectively. The slots are aligned with the holes and a bolt 40 goes through each set of slot-hole combinations. Each bolt is secured by a wing nut 42. Loosening of the wing nuts permits a user to slide the foot relative to its respective sidewall, thereby achieving a selected length to each sidewall, effecting leveling of the filing and organizing device 10 with respect to the passenger seat 28.

Referring now to FIGS. 2 and 3, the structural feature for securing the filing and organizing unit 10 with respect to the seat will be described. Connected with the sidewall 14 b, which is adjacent the back portion 44 of the passenger seat 28, is an upturned hook 24. In the figures, the upturned hook is shown attached to the sidewall 14b at its associated foot 34b. The upturned hook is dimensioned to permit the lap portion of a conventional seat belt 26 to slip thereon as shown in FIGS. 2 and 3. The seat belt is tightened in the usual manner to secure the filing and organizing device 10 releasably to the passenger seat 28.

In operation, the driver would place the filing and organizing device 10 on the seat portion 46 of the passenger seat 28 with the open end 16b of the shelves 16 facing him or her. In this orientation, the top overhang 18f will be adjacent the back portion 44 of the passenger seat 28. (The location of the overhangs 18e and 18f would be reversed for vehicles having the driver's seat on the right side of the vehicle; the Drawing presumes a vehicle having the driver's seat on the left side of the vehicle, as is practiced in the United States). The feet 34a and 34b will be resting on the seat portion 46 of the passenger seat 28. In the event the top 18 is not level, the wing nuts 42 may be loosened and the feet 34a and 34b slid so as to change the length of the sidewalls 14a and 14b, as needed to achieve a level attitude. Once a level attitude of the desk surface is satisfactorily achieved, the wing nuts are then tightened. The seat belt 26 is then slipped over the upturned hook 24 and thereupon tightened in the usual manner of conventional seat belts. When the seat belt 26 is tightened it is preferred that the overhang 18f contact the back portion 44 of the seat so as to provide a three-point contact with the passenger seat. The driver may thereupon retrievably file papers on the shelves 16, accessibly store articles in the receptacle 18c, lay presently needed objects on the desk surface 18a, and safely place a beverage in the receptacle 18d. In the event writing is necessary, the desk surface is readily available for this purpose.

To those skilled in the art which this invention appertains, the above described preferred embodiment may be subject to change or modficiation. Such change or modification can be carried out without departing from the scope of the invention, which is intended to be limited only by the scope of the appended claims.

What is claimed is:

1. A filing and organizing device for use in connection with a passenger seat of a motor vehicle, said passenger seat having a seat portion and a back portion, said motor vehicle futher having a seat belt for use by an occupant of said passenger seat, said seat belt having a lap portion, said filing and organizing device comprising:

a pair of sidewalls, each sidewall of said pair of sidewalls being mutually spaced apart, each said sidewall having an upper end and a lower end, each said lower end terminating in a foot for resting upon said portion of said passenger seat, each said foot providing a contact point with said passenger seat;

a plurality of shelves connected between each sidewall of said pair of sidewalls, each shelf of said plurality of shelves having a front end, a rear end and two side ends, each shelf of said plurality of shelves being connected to said pair of sidewalls at its respective said two side ends, each said shelf being accessible from its respective said front end;

a top connected with said upper end of each said sidewall, said top having a desk surface;

restraining means connected with one sidewall of said pair of sidewalls for selectively engaging said lap portion of said seat belt of said passenger seat so that said filing and organizing device may be secured to said passenger seat; and an overhang integrally connected with said top at a location adjacent one of said sidewalls, said overhang being dimensioned to contact said back portion of said passenger seat when said filing and organizing device is secured to said passenger seat by said restraining means, said overhang thereby serving to provide another contact point with said passenger seat which is in addition to that provided by each said foot.

2. The filing and organizing device of claim 1, wherein said top has a perimeter; said filing and organizing device further comprising a lip connected with said top, said lip extending along the entire perimeter of said top.

3. The filing and organizing device of claim 2, further comprising leveling means interconnected with said lower end of each said sidewall for selectively leveling said top when each said foot rests upon said seat portion of said passenger seat.

4. The filing organizing device of claim 3, further comprising a rearwall connected with said pair of sidewalls adjacent said rear end of each said shelf; each said shelf being connected with said pair of sidewalls such that said front ent of any one shelf of each said is located closer to said top than is said rear end of said any one said shelf.

5. The filing and organizing device of claim 4, wherein each said shelf has a notch located at said front end thereof.

6. The filing and organizing device of claim 4, wherein said restraining means comprises an upturned hook connected with one sidewall of said pair of sidewalls, said upturned hook being dimensioned for receiving said lap portion of seat belt.

7. The filing and organizing device of claim 6, wherein said leveling system comprises:

a foot slidably interconnected separately with each said sidewall of said pair of sidewalls for resting upon said set portion of said passenger seat; and means connected with each said sidewall for independently releasably holding its respective said foot at a selected position relative to said top.

8. The filing and organizing device of claim 7, wherein said top further comprises at least one overhang having at least one receptacle for a beverage container.

9. The filing and organizing device of claim 8, wherein said top further comprises at least one overhang having at least one receptacle for receiving loose articles.

10. A filing and organizing device for use in connection with a passenger seat of a motor vehicle, said passenger seat having a seat portion and a back portion, said motor vehicle further having a seat belt for use by an occupant of said passenger seat, said seat belt having a lap portion, said filing and organizing device comprising:

a pair of sidewalls, each sidewall of said pair of sidewalls being mutually spaced apart, each said sidewall having an upper end and a lower end, each said lower end terminating in a foot for resting upon said portion of said passenger seat;

a plurality of shelves connected between each sidewall of said pair of sidewalls, each shelf of said plurality of shelves having a front end and a rear end;

a top connected with said upper end of each said sidewall;

leveling means interconnected separately with each lower end of each said sidewall for selectively leveling said top when each said foot rests upon said seat portion of said passenger seat, said leveling means comprising:

a foot slidably interconnected separately with each said sidewall of said pair of sidewalls for resting upon said seat portion of said passenger seat; and means connected with each said sidewall for independently releasably holding its respective said foot at a selected position relative to said top; and restraining means connected with one sidewall of said pair of sidewalls for selectively engaging said lap portion of said seat belt of said passenger seat so that said filing and organizing device may be secured to said passenger seat.

11. The filing and organizing device of claim 10, wherein said top has a desk surface, further wherein said top has a perimeter; said filing and organizing device further comprising a lip connected with said top, said lip extending along the entire perimeter of said top.

12. The filing and organizing device of claim 11, further comprising a rearwall connected with said pair of sidewalls adjacent said rear end of each said shelf; each said shelf being connected with said pair of sidewalls such that said front end of any one shelf of each said shelf is located closer to said top than is said rear end of said any one shelf.

13. The filing and organizing device of claim 12, wherein each said shelf has a notch located at said front end thereof.

14. The filing and organizing device of claim 13, wherein said restraining means comprises an upturned hook connected with one sidewall of said pair of sidewalls, said upturned hook being dimensioned for receiving said lap portion of said seat belt.

15. The filing and organizing device of claim 14, wherein said top further comprises an overhang located adjacent one said sidewall, said overhang being dimensioned to contact said back portion of said passenger seat when said filing and organizing device is secured to said passenger seat by said restraining means, said overhang serving to provide another point of contact with said passenger seat which is in addition to that provided by each said foot.

16. The filing and organizing device of claim 15, wherein said top further comprises at least one overhang which has at least one first receptacle for a beverage container.

17. The filing organizing device of claim 16, wherein said top further comprises at least one overhang having at least one second receptacle for receiving loose articles.

18. A filing and organizing device for use in connection with a passenger seat of a motor vehicle, said passenger seat having a seat portion and a back portion, said motor vehicle further having a seat belt for use by an occupant of said passenger seat, said seat belt having a lap portion, said filing and organizing device comprising:

a pair of sidewalls, each sidewall of said pair of sidewalls being mutually spaced apart, each said sidewall having an upper end and a lower end;

a plurality of shelves connected between each sidewall of said pair of sidewalls, each shelf of said plurality of shelves having a front end and a rear end;

a top connected with said upper end of each said sidewall, said top having a desk surface, said top having a perimeter;

a lip connected with said top, said lip extending along the entire perimeter of said top;

leveling means interconnected separately with each said lower end of each said sidewall for selectively leveling said top when each said foot rests upon said seat portion of said passenger seat, said leveling means comprising:

a foot slidably interconnected separately with each said sidewall of said pair of sidewalls for resting upon said seat portion of said passenger seat; and means connected with each said sidewall for independently releasably holding its respective said foot at a selected position relative to said top;

restraining means connected withone sidewall of said pair of sidewalls for selectively engaging said lap portion said seat belt of said passenger seat so that said filing and organizing device may be secured to said passenger seat, said restraining means comprising an upturned hook connected with one sidewall of said pair of sidewalls, said upturned hook being dimensioned for receiving said lap portion of said seat belt; and an overhang integrally connected with said top at a location adjacent one of said sidewalls, said overhang being dimensioned to contact said back portion of said passenger seat when said filing and organizing device is secured to said passenger seat by said restraining means, said overhang thereby serving to provide another contact point with said passenger seat.

19. The filing and organizing device of claim 18, further comprising a rearwall connected with said pair of sidewalls adjacent said rear end of each said shelf; each said shelf being connected with said pair of sidewalls such that said front end of any one shelf of each said shelf is located closer to said top than is said rear end of said any one said shelf.

20. The filing and organizing device of claim 18, wherein each said shelf has a notch located at said front end thereof.

21. The filing and organizing device of claim 18, wherein said top further comprises at least one overhang which has at least one first receptacle for a beverage container.

22. The filing and organizing device of claim 18, wherein said top further comprises at least one overhang having at least one second receptacle for receiving loose articles.

* * * * *